US012209725B2

(12) United States Patent
Suwa et al.

(10) Patent No.: US 12,209,725 B2
(45) Date of Patent: Jan. 28, 2025

(54) LIGHT SOURCE DISTRIBUTION ELEMENT FOR HEADLIGHT DEVICE, HEADLIGHT DEVICE, AND HEADLIGHT MODULE

(71) Applicant: Mitsubishi Electric Corporation, Tokyo (JP)

(72) Inventors: Masashige Suwa, Tokyo (JP); Muneharu Kuwata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/289,115

(22) PCT Filed: May 12, 2021

(86) PCT No.: PCT/JP2021/018017

§ 371 (c)(1), (2) Date: Nov. 1, 2023

(87) PCT Pub. No.: WO2022/239140

PCT Pub. Date: Nov. 17, 2022

(65) Prior Publication Data

US 2024/0218990 A1 Jul. 4, 2024

(51) Int. Cl.
*F21S 41/24* (2018.01)
*F21S 41/20* (2018.01)
(Continued)

(52) U.S. Cl.
CPC ............. *F21S 41/24* (2018.01); *F21S 41/285* (2018.01); *F21S 41/321* (2018.01); *F21S 41/40* (2018.01); *F21S 41/25* (2018.01); *F21Y 2115/10* (2016.08)

(58) Field of Classification Search
CPC .......... F21S 41/24; F21S 41/285; F21S 41/40; F21S 41/25; F21S 41/43; F21S 41/143;
(Continued)

(56) References Cited

U.S. PATENT DOCUMENTS

2013/0242583 A1* 9/2013 Tsai .................... G02B 6/0035 362/510
2015/0367773 A1* 12/2015 Matsumaru ............ F21S 43/31 362/516
(Continued)

FOREIGN PATENT DOCUMENTS

JP 2010-212259 A 9/2010
JP 2015-176727 A 10/2015
(Continued)

OTHER PUBLICATIONS

Search English translation of WO 2015022848 A1 (Year: 2015).*
(Continued)

*Primary Examiner* — Omar Rojas Cadima
(74) *Attorney, Agent, or Firm* — XSENSUS LLP

(57) ABSTRACT

A light source distribution element for headlight device includes: a first light guide portion that is located between a first joint surface of an incident portion and a first emission portion, and is to guide light from the first joint surface of the incident portion to the first emission portion; and a second light guide portion that is located between a second joint surface of the incident portion and a second emission portion, has a first reflection surface formed on one of opposite side faces of the second light guide portion and a second reflection surface formed on the other one of the opposite side faces, and is to reflect light from the second joint surface of the incident portion by using the first reflection surface and the second reflection surface to guide the light to the second emission portion.

15 Claims, 6 Drawing Sheets

(51) Int. Cl.

| | |
|---|---|
| ***F21S 41/32*** | (2018.01) |
| ***F21S 41/40*** | (2018.01) |
| *F21S 41/25* | (2018.01) |
| *F21Y 115/10* | (2016.01) |

(58) Field of Classification Search
CPC ... F21V 5/04; F21W 2102/13; F21W 2107/00
See application file for complete search history.

(56) References Cited

U.S. PATENT DOCUMENTS

| | | | | |
|---|---|---|---|---|
| 2018/0299090 | A1 | 10/2018 | Owada | |
| 2021/0095828 | A1* | 4/2021 | Takenaga ................ | F21S 43/14 |
| 2022/0003375 | A1 | 1/2022 | Sugiyama et al. | |

FOREIGN PATENT DOCUMENTS

| | | | | |
|---|---|---|---|---|
| JP | 2018-045940 | A | 3/2018 | |
| JP | 2018-181635 | A | 11/2018 | |
| WO | WO-2015022848 | A1 * | 2/2015 ................ | B62J 6/02 |
| WO | 2020/021825 | A1 | 1/2020 | |

OTHER PUBLICATIONS

International Search Report and Written Opinion mailed on Jun. 29, 2021, received for PCT Application PCT/JP2021/018017, filed on May 12, 2021, 9 pages including English Translation.

* cited by examiner

LIGHT SOURCE DISTRIBUTION ELEMENT FOR HEADLIGHT DEVICE, HEADLIGHT DEVICE, AND HEADLIGHT MODULE

CROSS-REFERENCE TO RELATED APPLICATION

This application is based on PCT filing PCT/JP2021/018017, filed May 12, 2021, the entire contents of which are incorporated herein by reference.

TECHNICAL FIELD

The present disclosure relates to a headlight device that irradiates a region in front of a vehicle body with light, a light source distribution element used in the headlight device, and a headlight module.

BACKGROUND ART

In a headlight device that irradiates a region in front of a vehicle body with light, a so-called headlight device, particularly, a low-beam headlight and a high-beam headlight, it is desired to improve the thinness and the light use efficiency. Patent Literature 1 discloses a low-beam headlight in which the thinness and the light use efficiency are improved.

In the low-beam headlight disclosed in Patent Literature 1, an LED, an LED collimator, a light guide body, and a projector lens are arranged along an optical axis direction.

The light guide body includes an incident portion, an emission portion, a total reflection portion, an attachment portion, and the like. The light guide body includes a first light guide body portion on the rear side and a second light guide body portion configured by two left and right portions on the front side along the optical axis. A plurality of total reflection surfaces are arranged inside the light guide body.

The total reflection portion is disposed on the right and left sides and on the upper and lower sides of the right and left sides with respect to the incident portion.

The light incident on the light guide body is output as it is as one part of the light without going through total reflection in the light guide body and without being cut, and is output as another part of the light while going through a plurality of times of total reflection in the light guide body, being cut, and being reused.

CITATION LIST

Patent Literature

Patent Literature 1: WO 2020-021825

SUMMARY OF INVENTION

Technical Problem

The light guide body in the low-beam headlight disclosed in Patent Literature 1 has a complicated configuration which includes the plurality of total reflection surfaces inside the light guide body, the first light guide body portion, and the second light guide body portion configured by the two left and right portions on the front side.

The present disclosure has been made in view of the above points, and an object of the present disclosure is to obtain a light source distribution element for a headlight device that has a simple structure and is downsized without reducing light use efficiency.

Solution to Problem

A light source distribution element for headlight device according to the present disclosure includes: an incident portion having an incident surface on which light from a light source is to be incident, and having a first joint surface and a second joint surface which are located along a first direction in a plane perpendicular to an optical axis of the light source; a first emission portion having a first emission surface to emit light; a second emission portion having a second emission surface to emit light located at a position, the position being different from a position of the first emission surface of the first emission portion in the first direction and in a second direction perpendicular to the first direction, the second direction being in the plane perpendicular to the optical axis of the light source; a first light guide portion that is located between the first joint surface of the incident portion and the first emission portion, and is to guide light from the first joint surface of the incident portion to the first emission portion; and a second light guide portion that is located between the second joint surface of the incident portion and the second emission portion, has a first reflection surface formed on one of opposite side faces of the second light guide portion in the second direction and a second reflection surface formed on another one of the opposite side faces, and is to reflect light from the second joint surface of the incident portion by using the first reflection surface and the second reflection surface to guide the light to the second emission portion.

Advantageous Effects of Invention

According to the present disclosure, it is possible to simplify the structure and reduce the size without reducing the light use efficiency.

DESCRIPTION OF EMBODIMENTS

First Embodiment

Figure 1:
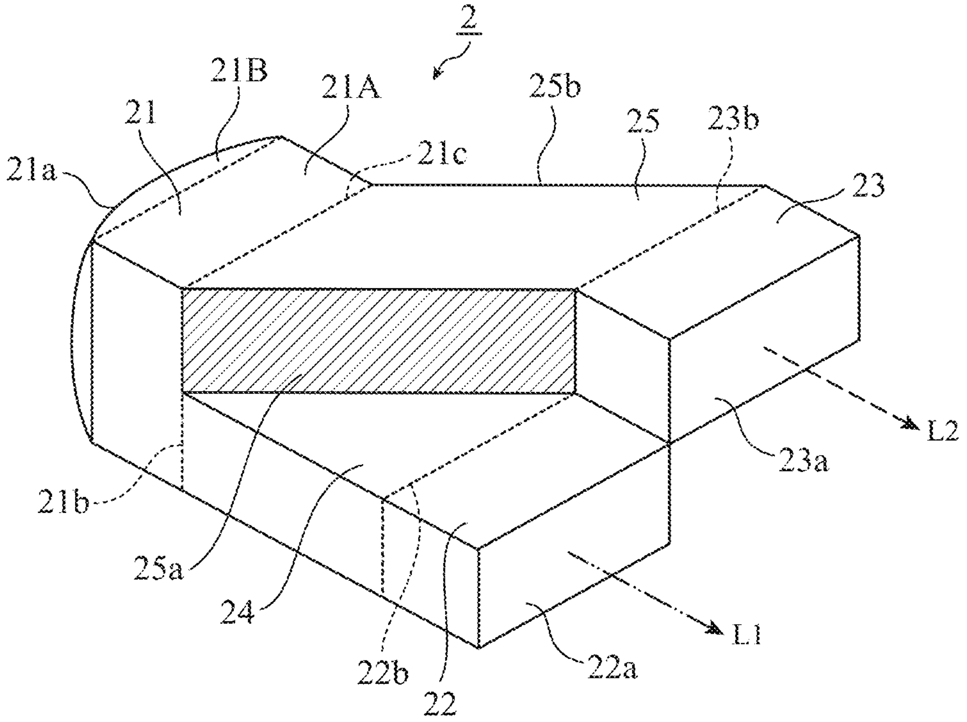
FIG. 1 is a perspective view illustrating a light source distribution element for a headlight device according to a first embodiment.

A light source distribution element 2 for a headlight device (Hereinafter, abbreviated as the light source distribution element 2) according to a first embodiment will be described with reference to FIGS. 1 to 5.

The light source distribution element 2 is used in a headlight device that satisfies a predetermined light distribution pattern defined by a road traffic regulation or the like and irradiates a region in front of a motorcycle, an automobile, or a tricycle called a gyro (Scooter and motorized bicycle made of three wheels with one front wheel and uniaxial two rear wheels).

The headlight device has a low beam and a high beam.

The light source distribution element 2 according to the first embodiment can be used for a low beam and a high beam, but is particularly suitable for being used for a low beam.

In the following description, an example used for a low beam of a headlight device for a motorcycle will be described.

Note that, in the case of being used for a low beam of a headlight device for an automobile, the number of light condensing optical systems 100 including the light source distribution element 2 may be one, or a plurality of light condensing optical systems 100 may be arranged in parallel in the left-right direction.

Before specifically describing the light source distribution element 2, terms used in the present disclosure will be described.

The light distribution refers to a luminous intensity distribution of a light source with respect to space. That is, it is a spatial distribution of light emitted from the light source.

The luminous intensity indicates the degree of intensity of light emitted from a light emitter, and is obtained by dividing a light flux passing through a minute solid angle in a certain direction by the minute solid angle.

According to a road traffic regulation, a low beam of a headlight device of a motorcycle and a headlight device of an automobile is required to have a horizontally long light distribution pattern which is narrow in the vertical direction and is required to have a clear boundary line of light on an upper side of the light distribution pattern, that is, a clear cutoff line in order not to dazzle an oncoming vehicle.

The light distribution pattern indicates the shape of the light flux and the light intensity distribution caused by the direction of the light emitted from a light source 1. The light distribution pattern is also used to mean the illuminance pattern on the irradiated surface.

The distribution of light distribution is a distribution of the intensity of light with respect to the direction of light emitted from a light source. The distribution of light distribution is also used to mean the illuminance distribution on the irradiated surface.

The state where the required cutoff line is clear means that a region over the cutoff line, that is, a region outside the light distribution pattern is dark, and a region under the cutoff line, that is, a region inside the light distribution pattern is bright.

The cutoff line is a dividing line between light and dark formed when a wall or a screen is irradiated with light of a headlight device, and is an upper dividing line of the light distribution pattern.

That is, the cutoff line is an upper boundary line of the light distribution pattern between light and dark. It is a boundary line between a bright region on the upper side of the light distribution pattern, that is, the region inside the light distribution pattern and a dark region, that is, the region outside the light distribution pattern. The cutoff line is a term used when an irradiation direction of a headlight device for passing each other is adjusted. The headlight device for passing each other is also referred to as a low beam.

It is required that the low beam has the maximum illuminance at the region under the cutoff line. The region of the maximum illuminance is referred to as a high illuminance region.

The region under the cutoff line means an upper portion of the light distribution pattern, and corresponds to a portion which irradiates a distant place in the headlight device.

In order to implement a clear cutoff line, a large chromatic aberration, blur or the like should not occur in the cutoff line. The occurrence of blur in the cutoff line means that the cutoff line is unclear.

In the low beam of the headlight device for a motorcycle, the cutoff line is a straight line horizontal to the left-right direction of the vehicle, and the light distribution pattern is brightest in a region under the cutoff line, that is, inside the light distribution pattern.

In the low beam of the headlight device for an automobile, the cutoff line has a stepped shape having a rising line.

In addition, since the headlight device is disposed on the front surface of an automobile, the design is important, and a headlight device having an increased degree of design freedom is required.

When the headlight device has a small thickness in the vertical direction of the vehicle in order to enhance the design, the light use efficiency decreases.

The light source distribution element 2 according to the first embodiment enhances the design by reducing the thickness of the light emission surface in the vertical direction. The light source distribution element 2 according to the first embodiment is miniaturized without deteriorating the light use efficiency by focusing on the Abbe's invariant (Abbe's sine condition or étendue conservation law).

In the following description, XYZ coordinates are used for easy description.

The left-right direction of the vehicle is defined as an X-axis direction. The right side with respect to the forward direction of the vehicle is defined as a negative direction of the X axis, and the left side with respect to the forward direction of the vehicle is defined as a positive direction of the X axis. Here, the forward direction refers to a traveling direction of the vehicle. That is, the forward direction is a direction in which the headlight device emits light.

In the light source distribution element 2 according to the first embodiment, the X-axis direction is a second direction.

A vertical direction of the vehicle is defined as a Y-axis direction. The upper side is defined as a positive direction of the Y axis, and the lower side is defined as a negative direction of the Y axis. The upper side is the direction of the sky, and the lower side is the direction of the ground (road surface or the like).

The traveling direction of the vehicle is defined as a Z-axis direction. The traveling direction is defined as a positive direction of the Z axis, and the opposite direction is defined as a negative direction of the Z axis. The positive direction of the Z axis is referred to as a front, and the negative direction of the Z axis is referred to as a rear. That is, the positive direction of the Z axis is a direction in which the headlight emits light.

The Z-X plane is a plane parallel to the road surface.

The road surface is usually considered to be a horizontal plane, that is, a plane perpendicular to the direction of gravity. However, the road surface may be inclined by an uphill, a downhill, or the like with respect to the traveling direction of the vehicle.

In addition, a general road surface is rarely inclined in the left-right direction, that is, in the width direction of the traveling path with respect to the traveling direction of the vehicle, but the road surface may be inclined in the left-right direction.

Therefore, the horizontal plane, which is a plane parallel to the road surface, is not necessarily a plane perpendicular to the direction of gravity, but the following description is given assuming that the horizontal plane is a plane perpendicular to the direction of gravity, and the Z-X plane is a plane perpendicular to the direction of gravity.

Hereinafter, the light source distribution element 2 will be specifically described.

Figure 2:
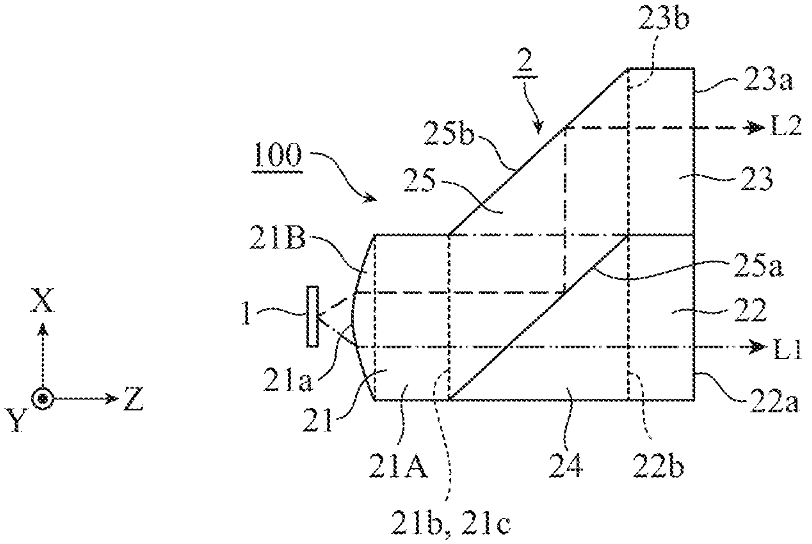
FIG. 2 is a plan view illustrating a light condensing optical system including the light source distribution element for a headlight device according to the first embodiment.
Figure 3:
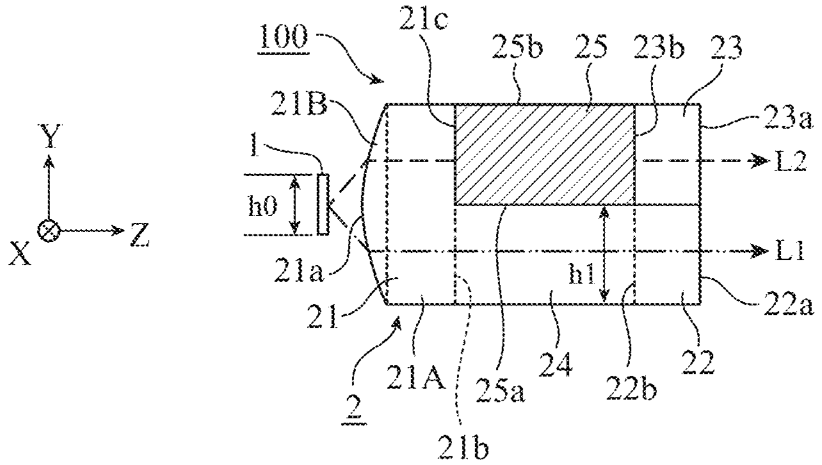
FIG. 3 is a right side view illustrating the light condensing optical system including the light source distribution element for a headlight device according to the first embodiment.
Figure 4:
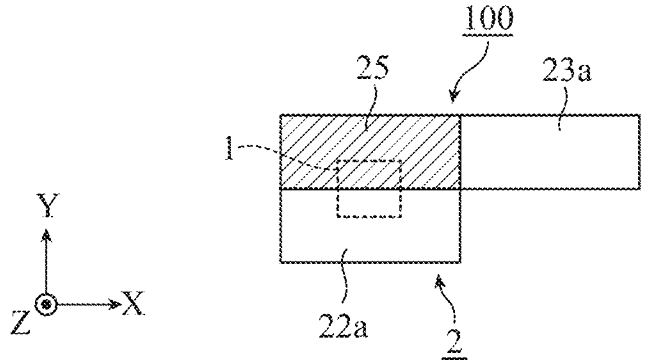
FIG. 4 is a front view illustrating the light condensing optical system including the light source distribution element for a headlight device according to the first embodiment.

First, the light condensing optical system 100 including the light source distribution element 2 includes the light source 1 as illustrated in FIGS. 2 to 4.

The light source 1 emits light for illuminating the region in front of the vehicle. The light source 1 is disposed on the negative side of the Z axis of the light source distribution element 2, and emits light in the positive direction of the Z axis. The optical axis of the light source 1 coincides with the optical axis of the light condensing optical system 100.

The light source 1 has a rectangular, in this example square, emission surface that emits light forward.

The light source 1 is any of a bulb light source such as an incandescent lamp, a halogen lamp, or a fluorescent lamp, and a semiconductor light source such as a light emitting diode (Hereinafter referred to as LED.) or a laser diode (hereinafter referred to as LD.).

From the viewpoint of reducing the load on the environment by suppressing the emission of carbon dioxide ($CO_2$) and the consumption of fuel, it is preferable to use a semiconductor light source which has high luminous efficiency and directivity as compared with a halogen lamp and which can reduce the size and weight of the optical system.

In the light condensing optical system 100 of the present disclosure, an LED which is one of the semiconductor light sources is used.

As illustrated in FIGS. 1 to 4, the light source distribution element 2 includes an incident portion 21, a first emission portion 22, a second emission portion 23, a first light guide portion 24, and a second light guide portion 25.

The incident portion 21 has an incident surface 21*a* on which light from the light source 1 is incident, and has a first joint surface 21*b* and a second joint surface 21*c* located along the vertical direction which is a first direction in a plane perpendicular to the optical axis of the light source 1.

Note that the first joint surface 21*b* and the second joint surface 21*c* do not physically have joint surfaces, and are virtual surfaces indicating boundary surfaces between the incident portion 21 and the first and second light guide portions 24 and 25.

The incident portion 21 includes a base portion 21A having a rectangular parallelepiped shape, and a lens 21B integrally formed with the base portion 21A and having, as a front surface, a convex incident surface 21*a* having a positive refractive power on at least a part thereof.

The lens 21B is a convex lens whose joint surface with the base portion 21A has a rectangular or circular shape.

The incident portion 21 condenses light emitted from the light source 1 and incident from the incident surface 21*a* with a small divergence angle by using the lens 21B, and guides side-by-side light, ideally parallel light, to the first joint surface 21*b* and the second joint surface 21*c* via the base portion 21A.

The base portion 21A of the incident portion 21 has a square shape in a Y-X plane, that is, a vertical plane perpendicular to a horizontal plane (Z-X plane) and perpendicular to the optical axis. The first joint surface 21*b* is located in the lower half of the vertical plane, and the second joint surface 21*c* is located in the upper half of the vertical plane.

Note that it is sufficient that the sum of the area of the first joint surface 21*b* and the area of the second joint surface 21*c* be the area of the vertical plane of the base portion 21A.

In addition, the shape of the vertical plane is not limited to a square, and may be a rectangle. In short, it is sufficient that the vertical plane be a rectangle, the first joint surface 21*b* be located below the second joint surface 21*c*, and the sum of the area of the first joint surface 21*b* and the area of the second joint surface 21*c* be the area of the vertical plane of the base portion 21A.

The first emission portion 22 includes a first emission surface 22*a* that emits light and a third joint surface 22*b* parallel to the first emission surface 22*a*.

The first emission surface 22*a* and the third joint surface 22*b* are parallel to the first joint surface 21*b* of the incident portion 21 and have the same shape.

The second emission portion 23 includes a second emission surface 23*a* that emits light and a fourth joint surface 23*b* parallel to the second emission surface 23*a*.

The second emission surface 23*a* and the fourth joint surface 23*b* are parallel to the second joint surface 21*c* of the incident portion 21 and have the same shape.

The second emission surface 23*a* emits light located at a position. This position is different from a position of the first emission surface 22*a* of the first emission portion 22 in the first direction, that is, in the vertical direction and in the second direction perpendicular to the first direction on the plane perpendicular to the optical axis of the light source 1, that is, in the left-right direction.

The upper left side of the first emission portion 22 and the lower right side of the second emission portion 23 are in contact with each other, and the upper left corner of the first emission surface 22*a* and the lower right corner of the second emission surface 23*a* coincide with each other.

Note that the upper left corner of the first emission surface 22*a* and the lower right corner of the second emission surface 23*a* do not necessarily coincide with each other.

In addition, the first emission surface 22*a* and the second emission surface 23*a* may physically have emission surfaces, or may be virtual emission surfaces.

The first emission surface 22*a* and the second emission surface 23*a* are light emission reference surfaces serving as a reference of the amount of light emission from the light source distribution element 2, regardless of whether they physically exist or are virtual emission surfaces.

In addition, the third joint surface 22*b* and the fourth joint surface 23*b* do not physically have joint surfaces, and are a virtual surface indicating a boundary surface between the first emission portion 22 and the first light guide portion 24 and a virtual surface indicating a boundary surface between the second emission portion 23 and the second light guide portion 25.

The first light guide portion 24 is located between the first joint surface 21*b* of the incident portion 21 and the third joint surface 22*b* of the first emission portion 22, and guides light from the first joint surface 21*b* of the incident portion to the first emission portion 22.

The first light guide portion 24 has a rectangular parallelepiped shape linearly connecting the first joint surface 21*b* and the third joint surface 22*b*, and the shape of the vertical cross section of the first light guide portion 24, which is the Y-X plane, is the same as the first joint surface 21*b* and the third joint surface 22*b*.

The light guided from the first joint surface 21*b* of the incident portion 21 to the first light guide portion 24, which is a part of the light from the light source 1 incident on the incident surface 21*a* of the incident portion 21, travels straight in parallel with the optical axis of the light source 1 as the first light L1, is guided to the third joint surface 22*b* of the first emission portion 22, and is emitted as light parallel to the optical axis of the light source 1 from the first emission surface 22*a* of the first emission portion 22, as indicated by a two-dot-dash line arrow in FIGS. 1 to 3.

The second light guide portion 25 is located between the second joint surface 21*c* of the incident portion 21 and the fourth joint surface 23*b* of the second emission portion 23, and has a first reflection surface 25*a* formed on the right side face out of the opposite side faces in the second direction, that is, the left-right direction and a second reflection surface 25*b* formed on the left side face out of the opposite side faces in the left-right direction. The light from the second joint surface 21*c* of the incident portion 21 is reflected by the first reflection surface 25*a* and the second reflection surface 25*b* and thereby guided to the second emission portion 23.

The second light guide portion 25 has a rectangular shape linearly connecting the second joint surface 21*c* and the fourth joint surface 23*b* while inclined in the left-right direction with respect to the optical axis of the light source 1, in this example, inclined in the left direction by 45 degrees. The shape of the vertical cross section of the second light guide portion 25, which is the Y-X plane, is the same as the shape of the second joint surface 21*c* and the shape of the fourth joint surface 23*b*.

The right side face and the left side face of the second light guide portion 25 are inclined in the left direction by 45 degrees, and the right side face and the left side face are parallel to each other.

The second light guide portion 25 has a first bent portion bent in the second direction, in this example, the left direction and a second bent portion bent in the opposite direction to the first bent portion. the first bent portion is located at the second joint surface 21*c* of the incident portion 21, and the second bent portion is located at the fourth joint surface 23*b* of the second emission portion 23.

The light guided from the second joint surface 21*c* of the incident portion 21 to the second light guide portion 25, which is another part of the light from the light source 1 incident on the incident surface 21*a* of the incident portion 21, travels straight in parallel with the optical axis of the light source 1 as the second light L2, and the light having reached the first reflection surface 25*a* is totally reflected at a right angle by the first reflection surface 25*a*, as indicated by a dotted arrow in FIGS. 1 to 3.

The light totally reflected by the first reflection surface 25*a* and having reached the second reflection surface 25*b* is totally reflected at a right angle by the second reflection surface 25*b* and guided to the fourth joint surface 23*b* of the second emission portion 23.

The light guided to the fourth joint surface 23*b* is emitted from the second emission surface 23*a* of the second emission portion 23 as light parallel to the optical axis of the light source 1.

The incident portion 21, the first emission portion 22, the second emission portion 23, the first light guide portion 24, and the second light guide portion 25 constituting the light source distribution element 2 are integrally formed of a transmissive material.

The light source distribution element 2 is a transmissive material manufactured by injection molding and filled with a refractive material.

The material from which the light source distribution element 2 is manufactured is preferably a material having high transparency from the viewpoint of light use efficiency and excellent in heat resistance because it is disposed immediately next to the light source 1.

For example, glass or transparent resin of silicone material is preferable.

Specifically, as the transparent resin, acrylic resin (particularly, PMMA: polymethyl methacrylate), polycarbonate (PC), cycloolefin resin, and the like are suitable.

In the light source distribution element 2 according to the first embodiment configured as described above, the light from the light source 1 is guided to the inside of the incident portion 21 while the divergence angle of the light is reduced by the incident surface 21*a* of the incident portion 21. Further, the incident light flux incident on the incident portion 21 is divided and branched into two in the vertical direction by using the two light guide portions of the first light guide portion 24 and the second light guide portion 25. Further, the branched light fluxes are emitted from the first emission surface 22*a* of the first emission portion 22 and the second emission surface 23*a* of the second emission portion 23.

As described above, the incident light flux incident on the incident portion 21 is divided and branched into two in the vertical direction by the first light guide portion 24 and the second light guide portion 25. Thereby, it is possible to make the apparent size of a light source related to the first emission surface 22*a* of the first emission portion 22 and the second emission surface 23*a* of the second emission portion 23, which are the emission reference surfaces, in the division direction, that is, in the vertical direction smaller than the light source size of the light source in a case of not being divided into two.

The total light-emitting surface size of the first emission surface 22*a* of the first emission portion 22 and the second emission surface 23*a* of the second emission portion 23 at this time is the same as the light source size based on the light from the light source 1.

Therefore, it is possible to thin the light condensing optical system 100 in the vertical direction without deteriorating the light use efficiency by the light source distribution element 2.

This point will be further described.

The apparent size of the light source is defined by "Abbe's invariant" defined by the product of the divergence angle of the light source in a certain direction and the length of the side of the light source in the direction.

Figure 5:
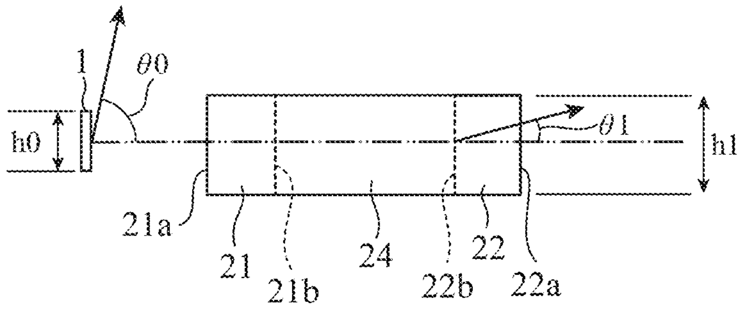
FIG. 5 is a schematic view for explaining an Abbe's invariant in the light condensing optical system including the light source distribution element for a headlight device according to the first embodiment.

Now, as illustrated in FIGS. 3 and 5, when the height of the light source 1, that is, the length in the vertical direction of the light source 1 is h0, the divergence angle in the vertical direction of the light from the light source 1 is θ0, the length in the vertical direction of the first emission surface 22*a* of the first emission portion 22, that is, the length of the vertical side of the first emission surface 22*a* is h1, and the divergence angle in the vertical direction of the light emitted from the first emission surface 22*a* is θ1, the relationship of the following formula (1) is established.

$$h0 \times \sin\theta 0 > h1 \times \sin\theta 1 \tag{1}$$

As an example, when the length h0 in the vertical direction of the LED which is the light source 1 is 1 mm, the divergence angle θ0 in the vertical direction of the light from the LED is 90 degrees, the length h1 in the vertical direction of the first emission surface 22*a* is 9.0 mm, and the divergence angle θ1 in the vertical direction of the light emitted from the first emission surface 22*a* is 3 degrees, the left side of the formula (1) is the following formula (2), and the right side of the formula (1) is the following formula (3).

$$h0 \times \sin\theta 0 = 1.0 \tag{2}$$

$$h1 \times \sin\theta 1 = 0.47 \tag{3}$$

As is clear from the formulas (2) and (3), the light condensing optical system 100 satisfies the formula (1).

Therefore, in the direction in which the light flux of the light source is divided, that is, in the vertical direction, it is possible to make the apparent size related to the first emission surface 22*a* of the first emission portion 22 and the second emission surface 23*a* of the second emission portion 23, which are the emission reference surfaces, smaller than the light source size of the light source in a case of not being divided into two.

As a result, it is possible to thin the light condensing optical system 100 in the vertical direction while preventing a decrease in the light use efficiency by the light source distribution element 2.

In short, in the light source distribution element 2 according to the first embodiment, the product of the length h1 in the vertical direction of the first emission surface 22*a* of the first emission portion 22 and the divergence angle θ1 in the vertical direction of the light emitted from the first emission surface 22*a* is set to a value smaller than the product of the length h0 in the vertical direction of the light source 1 and the divergence angle θ0 in the vertical direction of the light from the light source 1.

Note that the product of the length h2 in the vertical direction of the second emission surface 23*a* of the second emission portion 23 and the divergence angle θ2 in the vertical direction of the light emitted from the second emission surface 23*a* is set to a value smaller than the product of the length h0 in the vertical direction of the light source 1 and the divergence angle θ0 in the vertical direction of the light from the light source 1, similarly to the relationship between the first emission surface 22*a* and the light source 1.

That is, it is set in such a way as to satisfy the following formula (4).

$$h0 \times \sin\theta 0 > h2 \times \sin\theta 2 \tag{4}$$

As described above, the light source distribution element 2 according to the first embodiment includes: the first light guide portion 24 that is located between the first joint surface 21*b* of the incident portion 21 and the first emission portion 22, and guides the light from the first joint surface 21*b* of the incident portion 21 to the first emission portion 22; and the second light guide portion 25 that is located between the second joint surface 21*c* of the incident portion 21 and the second emission portion 23, has the first reflection surface 25*a* formed on one of the opposite side faces of the second light guide portion 25 in the second direction and the second reflection surface 25*b* formed on the other one of the opposite side faces, and reflects light from the second joint surface 21*c* of the incident portion 21 by using the first reflection surface 25*a* and the second reflection surface 25*b* to guide the light to the second emission portion 23. Thus, the structure can be simplified and the size can be reduced without deteriorating the light use efficiency.

That is, assuming that the first direction is the vertical direction and the second direction is the left-right direction, the thin light condensing optical system 100 can be manufactured.

Note that, in the light source distribution element 2 of the first embodiment, the number of divisions of the light flux is two in the vertical direction, but it is not limited thereto. The number of divisions may be three or more in the vertical direction, or two in each of the vertical direction and the left-right direction resulting in four in total. In short, it is sufficient to provide a plurality of emission portions and a plurality of light guide portions each of which guides light from the incident portion to the corresponding one of the plurality of emission portions.

In addition, the first emission surface 22*a* may be divided into two in the vertical direction, the divided surfaces may be regarded as the first joint surface 21*b* and the second joint surface 21*c* of the incident portion 21, the first light guide portion 24 and the first emission portion 22 may be formed on the surface regarded as the first joint surface 21*b*, the second light guide portion 25 and the second emission portion 23 may be formed on the surface regarded as the second joint surface 21*c*, the second emission surface 23*a* may be divided into two in the vertical direction, the divided surfaces may be regarded as the first joint surface 21*b* and the second joint surface 21*c* of the incident portion 21, the first light guide portion 24 and the first emission portion 22 may be formed on the surface regarded as the first joint surface 21*b*, and the second light guide portion 25 and the second emission portion 23 may be formed on the surface regarded as the second joint surface 21*c*.

Second Embodiment

A light source distribution element 2 according to a second embodiment will be described with reference to FIGS. 6 and 7.

The light source distribution element 2 according to the second embodiment is different from the light source distribution element 2 according to the first embodiment in that the first emission portion 22 and the second emission portion 23 have a convex first emission surface 22*a* and a convex second emission surface 23*a* each having a positive refractive power, respectively, and the other points are the same.

Figure 6:
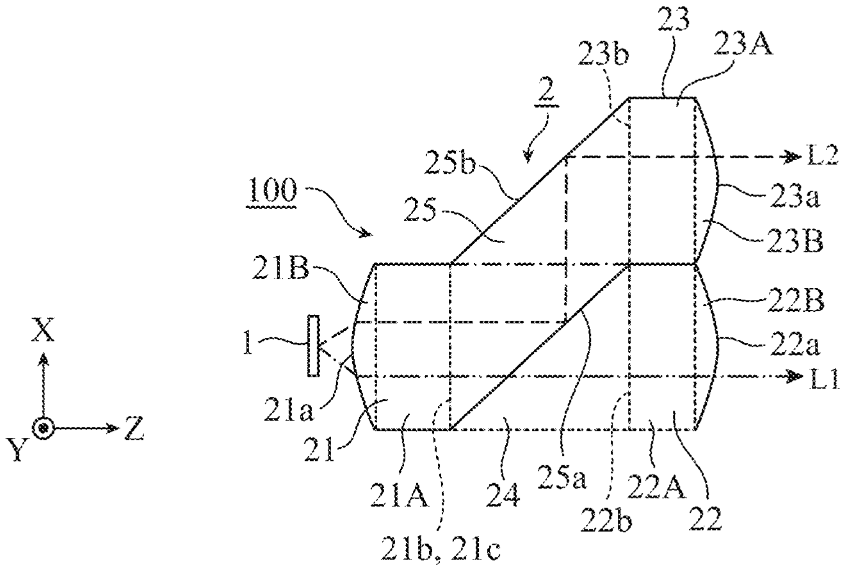
FIG. 6 is a plan view illustrating a light condensing optical system including a light source distribution element for a headlight device according to a second embodiment.
Figure 7:
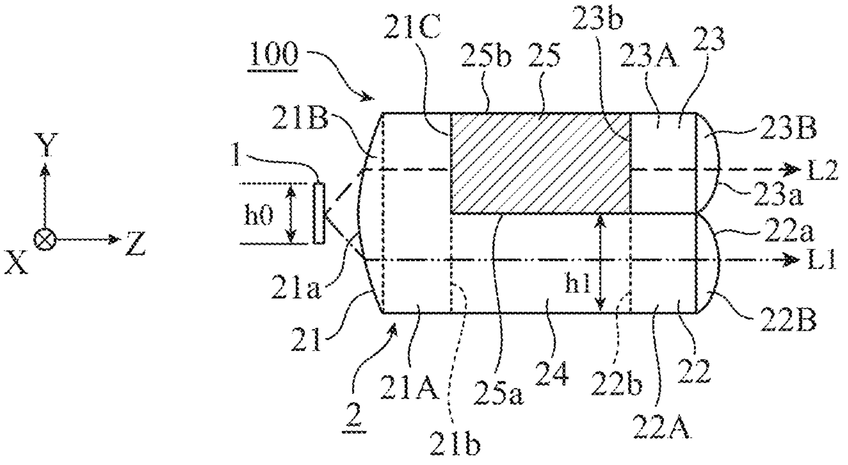
FIG. 7 is a right side view illustrating the light condensing optical system including the light source distribution element for a headlight device according to the second embodiment.
Figure 8:
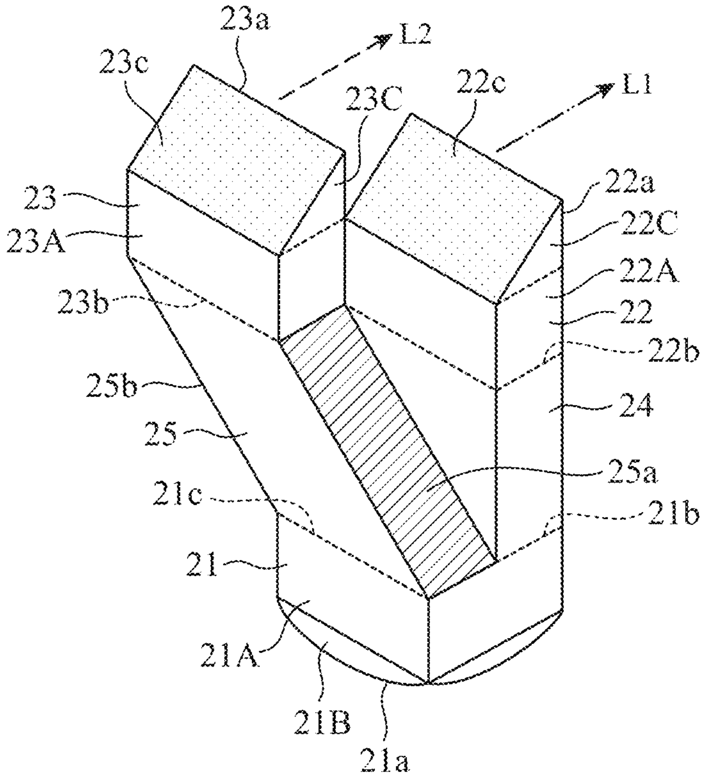
FIG. 8 is a perspective view illustrating a light source distribution element for a headlight device according to a third embodiment.

Note that, in FIGS. 6 and 7, the same reference numerals as those in FIGS. 1 to 4 denote the same or corresponding parts.

Hereinafter, differences from the light source distribution element 2 according to the first embodiment will be mainly described.

The first emission portion 22 includes a rectangular parallelepiped base portion 22A having a third joint surface 22*b* which is a joint surface with the first light guide portion 24. Further, the first emission portion 22 includes a lens 22B which is integrally formed with the base portion 22A on a surface facing the third joint surface 22*b* and which has, as a front surface, the convex first emission surface 22*a* having a positive refractive power on at least a part thereof.

The first emission portion 22 condenses and emits light from the first emission surface 22*a* by using the lens 22B.

The second emission portion 23 includes a rectangular parallelepiped base portion 23A having a fourth joint surface 23*b* which is a joint surface with the second light guide portion 25. Further, the second emission portion 23 includes a lens 23B which is integrally formed with the base portion 23A on a surface facing the fourth joint surface 23*b* and which has, as a front surface, the convex second emission surface 23*a* having a positive refractive power on at least a part thereof.

The second emission portion 23 condenses and emits light from the second emission surface 23*a* by using the lens 23B.

The light source distribution element 2 according to the second embodiment configured as described above also has the same effects as those of the light source distribution element 2 according to the first embodiment. In addition, the light is condensed and emitted by the convex first emission surface 22*a* formed on the front surface of the lens 22B of the first emission portion 22, and the light is condensed and emitted by the second emission surface 23*a* of the lens 23B of the second emission portion 23. Therefore, the optical system of the headlight device disposed ahead of the light source distribution element 2 can be further downsized than the optical system of the headlight device disposed ahead of the light source distribution element 2 according to the first embodiment.

Third Embodiment

A light source distribution element 2 according to a third embodiment will be described with reference to FIGS. 8 to 11.

The light source distribution element 2 according to the third embodiment is different in that the light source distribution element 2 is disposed on the Y axis with respect to the light source 1, whereas the light source distribution element 2 according to the first embodiment is disposed on the Z axis with respect to the light source 1. As a result, the light source distribution element 2 according to the third embodiment is different in that the first emission portion 22 and the second emission portion 23 have a first optical path changing portion 22C and a second optical path changing portion 23C for changing the optical path in the positive direction of the Z axis, respectively, and the other points are the same.

Note that, in FIGS. 8 to 11, the same reference numerals as those in FIGS. 1 to 4 denote the same or corresponding parts.

Hereinafter, differences in the light source distribution element 2 according to the third embodiment from the light source distribution element 2 according to the first embodiment will be mainly described.

The light source 1 is disposed on the negative side of the Y axis with respect to the light source distribution element 2, and emits light in the positive direction of the Y axis, that is, upward in the vertical direction. The optical axis of the light source 1 is along the Y axis and coincides with the optical axis of the light condensing optical system 100.

In the light source distribution element 2 according to the third embodiment, a first direction is the front-rear direction, that is, the Z-axis direction, and a second direction is the left-right direction, that is, the X-direction.

The light source distribution element 2 is disposed on the positive side of the Y axis with respect to the light source 1. The light source distribution element 2 condenses the light emitted from the light source 1 and incident from the incident surface 21*a* of the lens 21B with a small divergence angle. Then, the light source distribution element 2 guides side-by-side light, ideally parallel light, to the first joint surface 21*b* and the second joint surface 21*c* via the base portion 21A, along the Y axis, that is, in the vertical direction.

The first joint surface 21*b* and the second joint surface 21*c* are located along the front-rear direction which is the first direction.

The first emission portion 22 has the first emission surface 22*a* located on the front surface in the front-rear direction, and has a third reflection surface 22*c* that reflects the light guided by the first light guide portion 24 and thereby guides the light to the first emission surface 22*a*.

The first emission portion 22 includes a rectangular parallelepiped base portion 22A having a third joint surface 22*b* which is a joint surface with the first light guide portion 24. Further, the first emission portion 22 includes the first optical path changing portion 22C which is integrally formed with the base portion 22A on a surface facing the third joint surface 22*b*, has the first emission surface 22*a* on a front surface, and has the third reflection surface 22*c* formed on an upper surface.

The third joint surface 22*b* is parallel to the first joint surface 21*b* of the incident portion 21 and has the same shape as the first joint surface 21*b*.

The first optical path changing portion 22C has an inclined surface inclined by 45 degrees with respect to a surface facing the third joint surface 22*b*. The third reflection surface 22*c* is formed on the inclined surface. In the front surface, a portion between the inclined surface and the surface facing the third joint surface 22*b* is the first emission surface 22*a*.

Figure 9:
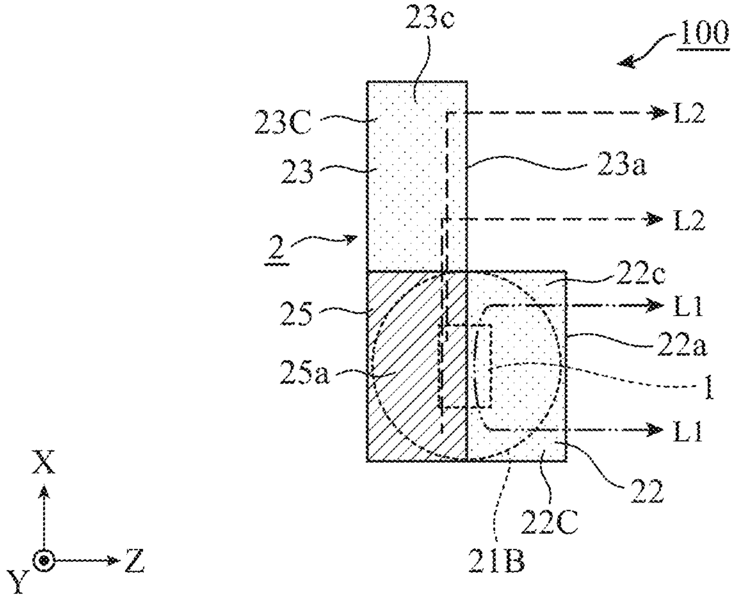
FIG. 9 is a plan view illustrating a light condensing optical system including the light source distribution element for a headlight device according to the third embodiment.
Figure 10:
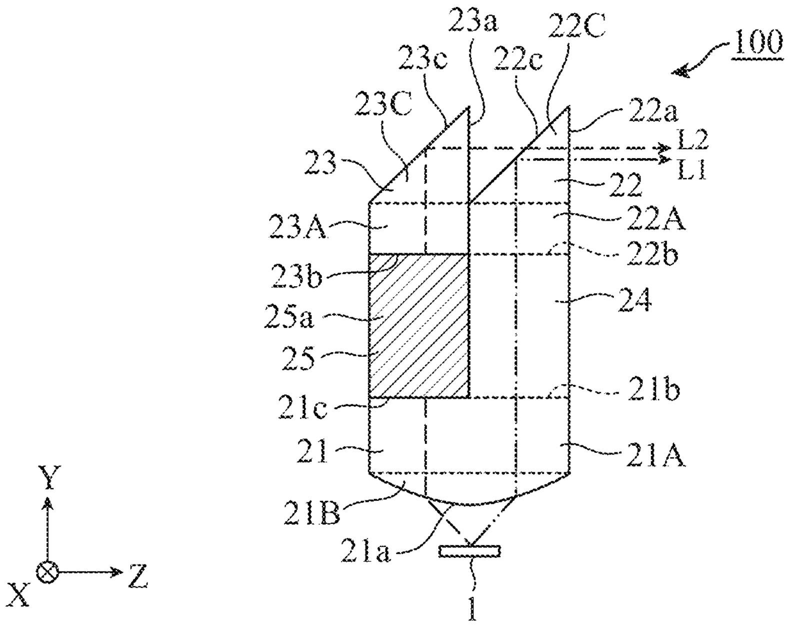
FIG. 10 is a right side view illustrating the light condensing optical system including the light source distribution element for a headlight device according to the third embodiment.
Figure 11:
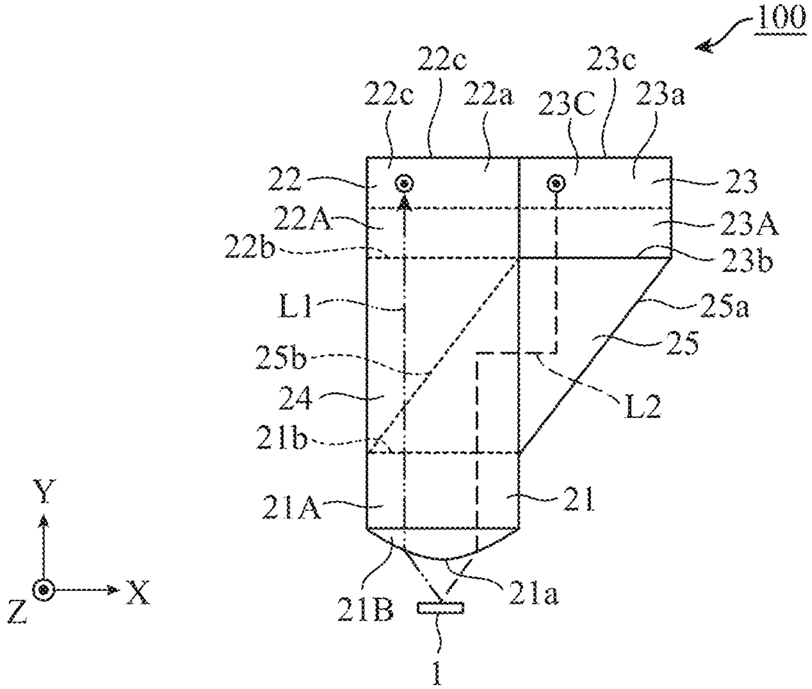
FIG. 11 is a front view illustrating the light condensing optical system including the light source distribution element for a headlight device according to the third embodiment.

That is, as illustrated in FIGS. 9 to 11, the light guided to the surface facing the third joint surface 22*b* is totally reflected by the third reflection surface 22*c*, the optical path of the light is changed by 90 degrees, and the light is emitted forward in the front-rear direction from the first emission surface 22*a*.

The third reflection surface 22*c* may be a reflection surface having a light condensing function. In this case, the third reflection surface 22*c* is a reflection surface having positive power.

By providing the third reflection surface 22*c* with a light condensing function as described above, a complicated distribution of light distribution required for the headlight device can be easily formed.

In addition, the third reflection surface 22*c* may be an aggregate of reflection surfaces having a light condensing function. In this case, the third reflection surface 22*c* is required to have positive power as a whole.

The second emission portion 23 has the second emission surface 23*a* located on the front surface in the front-rear direction, and has a fourth reflection surface 23*c* that reflects the light guided by the second light guide portion 25 and thereby guides the light to the second emission surface 23*a*.

The second emission portion 23 includes a rectangular parallelepiped base portion 23A having a fourth joint surface 23*b* which is a joint surface with the second light guide portion 25. Further, the second emission portion 23 includes the second optical path changing portion 23C which is integrally formed with the base portion 23A on a surface facing the fourth joint surface 23*b*, has the second emission surface 23*a* on a front surface, and has the fourth reflection surface 23*c* formed on an upper surface.

The fourth joint surface 23*b* is parallel to the second joint surface 21*c* of the incident portion 21 and has the same shape as the second joint surface 21*c*.

The second emission surface 23*a* emits light located at a position. This position is different from a position of the first emission surface 22*a* of the first emission portion 22 in the first direction, that is, in the front-rear direction and in the second direction perpendicular to the first direction on the plane perpendicular to the optical axis of the light source 1, that is, in the left-right direction.

The left rear side of the first emission portion 22 and the right front side of the second emission portion 23 are in contact with each other, and the left rear corner of the first emission surface 22*a* and the right front corner of the second emission surface 23*a* coincide with each other.

Note that the left rear corner of the first emission surface 22*a* and the right front corner of the second emission surface 23*a* do not necessarily coincide with each other.

The second optical path changing portion 23C has an inclined surface inclined by 45 degrees with respect to a surface facing the fourth joint surface 23*b*. The fourth reflection surface 23*c* is formed on the inclined surface. In the front surface, a portion between the inclined surface and the surface facing the fourth joint surface 23*b* is the second emission surface 23*a*.

That is, as illustrated in FIGS. 9 to 11, the light guided to the surface facing the fourth joint surface 23*b* is totally reflected by the fourth reflection surface 23*c*, the optical path of the light is changed by 90 degrees, and the light is emitted forward in the front-rear direction from the second emission surface 23*a*.

The fourth reflection surface 23*c* may be a reflection surface having a light condensing function. In this case, the fourth reflection surface 23*c* is a reflection surface having positive power.

By providing the fourth reflection surface 23*c* with a light condensing function as described above, a complicated distribution of light distribution required for the headlight device can be easily formed.

In addition, the fourth reflection surface 23*c* may be an aggregate of reflection surfaces having a light condensing function. In this case, the fourth reflection surface 23*c* is required to have positive power as a whole.

When the third reflection surface 22*c* and the fourth reflection surface 23*c* have a light condensing function, it is preferable that the third reflection surface 22*c* and the fourth reflection surface 23*c* have respective light condensing powers different from each other.

When the third reflection surface 22*c* and the fourth reflection surface 23*c* have the respective light condensing powers different from each other, light beams having different distributions of light distribution are emitted from the first emission portion 22 and the second emission portion 23.

Therefore, a complicated distribution of light distribution required for the headlight device can be easily formed with a higher degree of freedom by the combined light distribution of the first emission portion 22 and the second emission portion 23.

Note that, at least one of the third reflection surface 22*c* and the fourth reflection surface 23*c* may be a reflection surface having a light condensing function.

The first emission portion 22 and the second emission portion 23 are integrally formed of a transmissive material as the light source distribution element 2. The surface facing the third joint surface 22*b* and the surface facing the fourth joint surface 23*b* are virtual surfaces instead of physically existing surfaces. The first emission surface 22*a* and the second emission surface 23*a* may physically have emission surfaces or may be virtual emission surfaces.

The first light guide portion 24 is located between the first joint surface 21*b* of the incident portion 21 and the third joint surface 22*b* of the first emission portion 22, and guides light from the first joint surface 21*b* of the incident portion to the first emission portion 22.

The first light guide portion 24 has a rectangular parallelepiped shape linearly connecting the first joint surface 21*b* and the third joint surface 22*b*, and the shape of the horizontal cross section of the first light guide portion 24, which is the Z-X plane, is the same as the first joint surface 21*b* and the third joint surface 22*b*.

The light guided from the first joint surface 21*b* of the incident portion 21 to the first light guide portion 24, which is a part of the light from the light source 1 incident on the incident surface 21*a* of the incident portion 21, travels straight in parallel with the optical axis of the light source 1 as the first light L1, is guided to the third joint surface 22*b* of the first emission portion 22, is totally reflected at a right angle by the third reflection surface 22*c*, and is emitted forward from the first emission surface 22*a* as parallel light bent at a right angle with respect to the optical axis of the light source 1, as indicated by a two-dot-dash line arrow in FIGS. 8 to 11.

The second light guide portion 25 is located between the second joint surface 21*c* of the incident portion 21 and the fourth joint surface 23*b* of the second emission portion 23, and has a first reflection surface 25*a* formed on the right side face out of the opposite side faces in the second direction, that is, the left-right direction and a second reflection surface 25*b* formed on the left side face out of the opposite side faces in the left-right direction. The light from the second joint surface 21*c* of the incident portion 21 is reflected by the first reflection surface 25*a* and the second reflection surface 25*b* and guided to the second emission portion 23.

The second light guide portion 25 has a rectangular shape linearly connecting the second joint surface 21*c* and the fourth joint surface 23*b* to each other while inclined in the left-right direction with respect to the optical axis of the light source 1, in this example, inclined in the left direction by 45 degrees. The shape of the horizontal cross section of the second light guide portion 25, which is the Z-X plane, is the same as the shape of the second joint surface 21*c* and the shape of the fourth joint surface 23*b*.

The right side face and the left side face of the second light guide portion 25 are inclined in the left direction by 45 degrees, and the right side face and the left side face are parallel to each other.

The second light guide portion 25 has a first bent portion bent in the second direction, in this example, the left direction and a second bent portion bent in the opposite direction to the first bent portion. The first bent portion is located at the second joint surface 21*c* of the incident portion 21, and the second bent portion is located at the fourth joint surface 23*b* of the second emission portion 23.

The light guided from the second joint surface 21*c* of the incident portion 21 to the second light guide portion 25, which is another part of the light from the light source 1 incident on the incident surface 21*a* of the incident portion 21, travels straight in parallel with the optical axis of the light source 1 as the second light L2, and the light having reached the first reflection surface 25*a* is totally reflected at a right angle by the first reflection surface 25*a*, as indicated by a dotted arrow in FIGS. 8 to 11.

The light totally reflected by the first reflection surface 25*a* and having reached the second reflection surface 25*b* is totally reflected at a right angle by the second reflection surface 25*b* and guided to the fourth joint surface 23*b* of the second emission portion 23.

The light guided to the fourth joint surface 23*b* is totally reflected by the fourth reflection surface 23*c*, and is emitted forward from the second emission surface 23*a* as parallel light bent at a right angle with respect to the optical axis of the light source 1.

The light source distribution element 2 according to the third embodiment configured as described above guides the light from the light source 1 to the inside of the incident portion 21 while reducing the divergence angle of the light by using the incident surface 21*a* of the incident portion 21. Further, the light source distribution element 2 divides and branches the incident light flux incident on the incident portion 21 into two in the front-rear direction by using two light guide portions of the first light guide portion 24 and the second light guide portion 25. Further, the light source distribution element 2 totally reflects the branched incident light fluxes by using the third reflection surface 22*c* of the first emission portion 22 and the fourth reflection surface 23*c* of the second emission portion 23, and thereby emits the branched light fluxes forward from the first emission surface 22*a* and the second emission surface 23*a* as parallel light fluxes bent at a right angle with respect to the optical axis of the light source 1.

In the light source distribution element 2 according to the third embodiment, similarly to the light source distribution element 2 according to the first embodiment, the product of the length h1 in the vertical direction of the first emission surface 22*a* of the first emission portion 22 and the divergence angle θ1 in the vertical direction of the light emitted from the first emission surface 22*a* is set to a value smaller than the product of the length h0 in the front-rear direction of the light source 1 and the divergence angle θ0 in the front-rear direction of the light from the light source 1.

That is, it is set in such a way as to satisfy formula (1).

In addition, the product of the length h2 in the vertical direction of the second emission surface 23*a* of the second emission portion 23 and the divergence angle θ2 in the vertical direction of the light emitted from the second emission surface 23*a* is set to a value smaller than the product of the length h0 in the front-rear direction of the light source 1 and the divergence angle θ0 in the front-rear direction of the light from the light source 1.

That is, it is set in such a way as to satisfy formula (4).

Similarly to the light source distribution element 2 according to the first embodiment, the light source distribution element 2 according to the third embodiment configured as described above can simplify the structure and be downsized without reducing the light use efficiency.

Further, the branched incident light fluxes are totally reflected by the third reflection surface 22*c* of the first emission portion 22 and the fourth reflection surface 23*c* of the second emission portion 23. Thereby, the branched light fluxes are emitted forward from the first emission surface 22*a* and the second emission surface 23*a* as parallel light fluxes bent at a right angle with respect to the optical axis of the light source 1, so that the position at which the light from the light source distribution element 2 is extracted can be easily adjusted.

That is, in the light source distribution element 2 according to the third embodiment, the height in the vertical direction of the light emitted from the first emission surface 22*a* of the first emission portion 22 and the height in the vertical direction of the light emitted from the second emission surface 23*a* of the second emission portion 23 are the same. However, by changing the length in the vertical direction of the base portion 22A of the first emission portion 22 and the length in the vertical direction of the base portion 23A of the second emission portion 23, the height in the vertical direction of the light emitted from the first emission surface 22*a* and the height in the vertical direction of the light emitted from the second emission surface 23*a* can be changed. Thus, a free design in the headlight device can be supported, and as a result, the design of the headlight device can be improved.

In addition, by providing the third reflection surface 22*c* of the first emission portion 22 and the fourth reflection surface 23*c* of the second emission portion 23 with a light condensing function, a complicated distribution of light distribution required for the headlight device can be easily formed.

Furthermore, by providing the third reflection surface 22*c* and the fourth reflection surface 23*c* with different light condensing powers, a complicated distribution of light distribution required for the headlight device can be easily formed with a higher degree of freedom by the combined light distribution of the first emission portion 22 and the second emission portion 23.

Note that, as illustrated in the light source distribution element 2 according to the second embodiment, the light source distribution element 2 according to the third embodiment may be configured so that the first emission surface 22*a* in the first optical path changing portion 22C in the first emission portion 22 is the lens 22B having, as a front surface, the convex first emission surface 22*a* having a positive refractive power on at least a part thereof, and the second emission surface 23*a* in the second optical path changing portion 23C in the second emission portion 23 is the lens 23B having, as a front surface, the convex second emission surface 23*a* having a positive refractive power on at least a part thereof.

Fourth Embodiment

A headlight device according to a fourth embodiment will be described with reference to FIG. 12.

Figure 12:
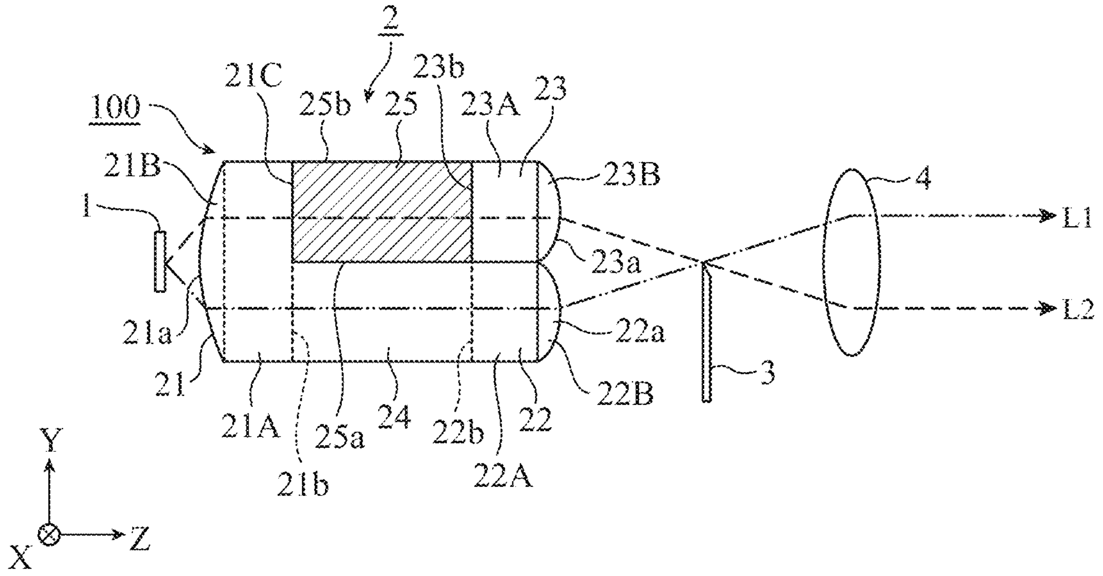
FIG. 12 is a right side view illustrating a headlight device according to a fourth embodiment.

Note that, in FIG. 12, the same reference numerals as those in FIGS. 6 and 7 denote the same or corresponding parts.

The headlight device according to the fourth embodiment is a low beam in a headlight device for a motorcycle.

Note that, when it is used in a low beam of a headlight device for an automobile, a plurality of headlight devices shown as the fourth embodiment may be arranged in parallel in the left-right direction as elements of the headlight device for an automobile. In this case, a shade 3 and a projection lens 4 may be integrally formed with the elements.

The headlight device according to the fourth embodiment includes a light source 1, a light source distribution element 2, the shade 3, and the projection lens 4.

A light condensing optical system 100 including the light source 1 and the light source distribution element 2 is a light condensing optical system 100 including the light source distribution element 2 according to the second embodiment.

However, the light condensing optical system 100 may include the light source distribution element 2 according to the third embodiment provided with the lens 22B in the first emission portion 22 and the lens 23B in the second emission portion 23.

The shade 3 is disposed at a light condensing position of the light source distribution element 2, and forms a cutoff line for the light emitted from the light source distribution element 2.

That is, the shade 3 blocks out a part of the light emitted from the light source distribution element 2 so that a region over the cutoff line, that is, a region outside the light distribution pattern is dark and a region under the cutoff line, that is, a region inside the light distribution pattern is bright.

The projection lens 4 receives light partially blocked out by the shade 3 and emits transmitted light having a light distribution pattern in which a cutoff line is formed forward as low beam irradiation light.

The projection lens 4 is located at a position having a relationship opposite to a positional relationship of the light source distribution element 2 with respect to the shade 3. That is, the shade 3 is disposed at a focal position of the projection lens 4.

In the headlight device according to the fourth embodiment configured as described above, the light source distribution element 2 in which the light from the light source 1 is incident on the incident surface 21*a* reduces the divergence angle of the light by using the incident surface 21*a*. Then, the light source distribution element 2 condenses, using the first emission surface 22*a* of the first emission portion 22 and the second emission surface 23*a* of the second emission portion 23, each of the parallel incident light fluxes branched into two by the two light guide portions of the first light guide portion 24 and the second light guide portion 25, and emits the light fluxes to the shade 3.

The shade 3 partially blocks out the light condensed by each of the first emission surface 22*a* and the second emission surface 23*a*, and the projection lens 4 emits forward the light partially blocked out by the shade 3 as low beam irradiation light having a light distribution pattern in which a cutoff line is formed.

Therefore, since the headlight device according to the fourth embodiment uses the light condensing optical system 100 including the light source distribution element 2 according to the second embodiment that can simplify the structure and be downsized without reducing the light use efficiency, the projection lens 4 can be shortened in the vertical direction, and the headlight device can flexibly cope with design by having a thin optical system.

Fifth Embodiment

A headlight module according to a fifth embodiment will be described with reference to FIG. 13.

Figure 13:
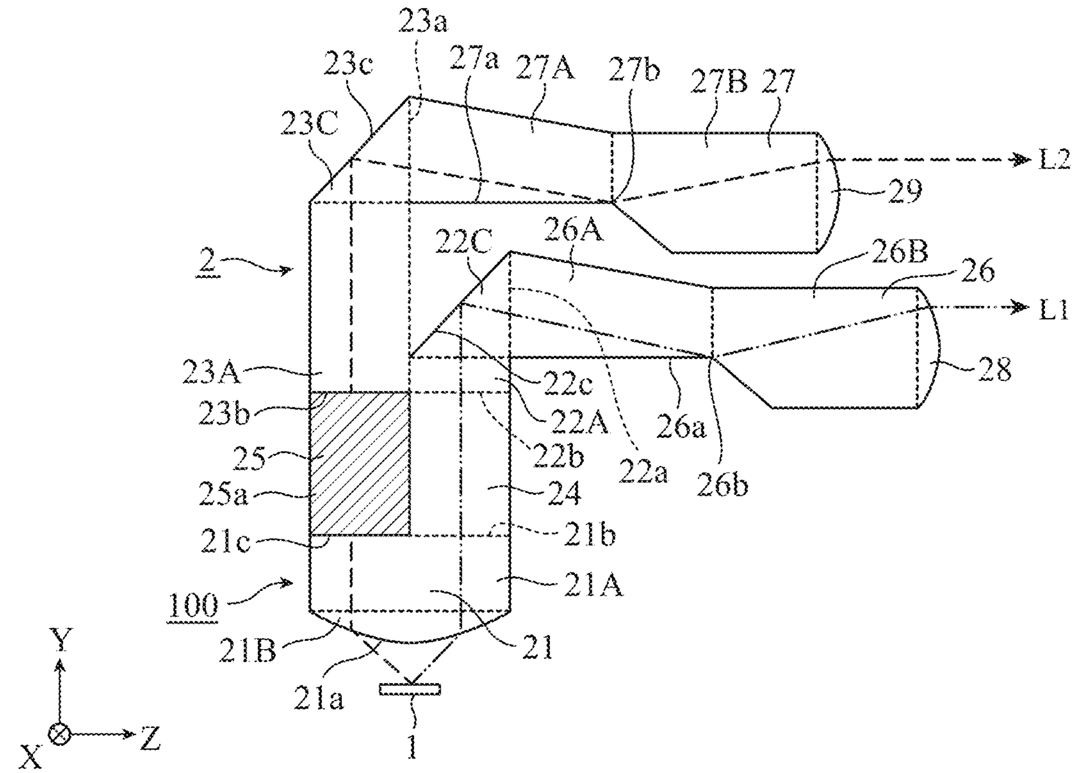
FIG. 13 is a right side view illustrating a headlight module according to a fifth embodiment.

Note that in FIG. 13, the same reference numerals as those in FIGS. 8 to 11 denote the same or corresponding parts.

The headlight module according to the fifth embodiment is used in a low beam in a headlight device for a motorcycle.

Note that, when it is used in a low beam of a headlight device for an automobile, a plurality of headlight modules shown as the fifth embodiment may be arranged in parallel in the left-right direction as elements of the headlight device for an automobile.

In the headlight module according to the fifth embodiment, a first cutoff line forming portion 26, a second cutoff line forming portion 27, a first projection lens 28, and a second projection lens 29 are integrally formed with the light source distribution element 2 according to the third embodiment.

The first cutoff line forming portion 26 is integrally formed to extend forward in the front-rear direction from the first emission surface 22*a* of the first emission portion 22 of the light source distribution element 2. The first cutoff line forming portion 26 has a fifth reflection surface 26*a* that reflects the light emitted from the first emission surface 22*a* and emits the light in which the cutoff line is formed, on the lower surface in the vertical direction.

The first cutoff line forming portion 26 has a first region portion 26A and a second region portion 26B.

One end surface of the first region portion 26A is a joint surface with the first emission surface 22*a* of the first emission portion 22, a lower surface thereof is located on a Z-X plane, that is, a horizontal plane, and an upper surface thereof is located on a plane inclined downward with respect to the horizontal plane. The right side face and the left side face of the first region portion 26A are located on the same plane as the right side face and the left side face of the first light guide portion 24, respectively.

The third reflection surface 22*c* of the first emission portion 22 totally reflects the light guided from the third joint surface 22*b*, and condenses and guides the light from the first emission surface 22*a* to the fifth reflection surface 26*a* of the first cutoff line forming portion 26. The third reflection surface 22*c* is formed with an inclination of less than 45 degrees with respect to the third joint surface 22*b* which is a horizontal plane.

Note that the third reflection surface 22*c* may be a reflection surface having a light condensing function similarly to the light source distribution element 2 according to the third embodiment.

The second region portion 26B integrally extends forward from the first region portion 26A. One end surface of the second region portion 26B is a joint surface with the other end surface of the first region portion 26A, the upper surface and the lower surface thereof are located on a horizontal plane, and the right side face and the left side face thereof are located on the same plane as the right side face and the left side face of the first region portion 26A, respectively.

The second region portion 26B guides light having a cutoff line, which is formed by reflecting light emitted from the first emission surface 22*a* by using the fifth reflection surface 26*a*, to the other end face.

The lower line in the joint surface between the first region portion 26A and the second region portion 26B, that is, the front end of the fifth reflection surface 26*a* is a ridge line 26*b* for forming the cutoff line.

The ridge line 26*b* is located so that a region over the cutoff line, that is, a region outside the light distribution pattern is dark and a region under the cutoff line, that is, a region inside the light distribution pattern is bright. The fifth reflection surface 26*a* reflects the incident light.

The second cutoff line forming portion 27 has a first region portion 27A and a second region portion 27B.

One end surface of the first region portion 27A is a joint surface with the second emission surface 23*a* of the second emission portion 23, a lower surface thereof is located on a Z-X plane, that is, a horizontal plane, and an upper surface thereof is a surface inclined downward with respect to the horizontal plane. The right side face and the left side face of the first region portion 27A are located on the same plane as the right side face and the left side face of the second light guide portion 25, respectively.

The fourth reflection surface 23*c* of the second emission portion 23 totally reflects the light guided from the fourth joint surface 23*b*, and condenses and guides the light from the second emission surface 23*a* to the sixth reflection surface 27*a*. The fourth reflection surface 23*c* is formed with an inclination of less than 45 degrees with respect to the fourth joint surface 23*b* which is a horizontal plane.

Note that the fourth reflection surface 23*c* may be a reflection surface having a light condensing function similarly to the light source distribution element 2 according to the third embodiment.

The length in the vertical direction of the base portion 23A of the second emission portion 23 is longer than the length in the vertical direction of the base portion 22A of the first emission portion 22, and the height of the second emission surface 23*a* of the second emission portion 23 is higher than the height of the first emission surface 22*a* of the first emission portion 22.

The second region portion 27B integrally extends forward from the first region portion 27A. One end surface of the second region portion 27B is a joint surface with the other end surface of the first region portion 27A, the upper surface and the lower surface thereof are located on a horizontal plane, and the right side face and the left side face thereof are located on the same plane as the right side face and the left side face of the first region portion 27A, respectively.

The second region portion 27B guides light having a cutoff line, which is formed by reflecting light emitted from the second emission surface 23*a* by using the sixth reflection surface 27*a*, to the other end surface.

The lower line in the joint surface between the first region portion 27A and the second region portion 27B, that is, the front end of the sixth reflection surface 27*a* is a ridge line 27*b* for forming the cutoff line.

The ridge line 27*b* is located so that a region over the cutoff line, that is, a region outside the light distribution pattern is dark and a region under the cutoff line, that is, a region inside the light distribution pattern is bright. The sixth reflection surface 27*a* reflects the incident light.

The first projection lens 28 is a convex lens in which a rectangular or circular flat surface is a joint surface with the other end surface of the second region portion 26B, and in which a convex emission surface is provided on the front surface.

The first projection lens 28 emits the light flux reflected by the fifth reflection surface 26*a* forward as low beam irradiation light which is light having a light distribution pattern having a cutoff line.

The focal position of the first projection lens 28 is located on the ridge line 26*b*.

The second projection lens 29 is a convex lens in which a rectangular or circular flat surface is a joint surface with the other end surface of the second region portion 27B, and in which a convex emission surface is provided on the front surface.

The second projection lens 29 emits the light flux reflected by the sixth reflection surface 27*a* forward as low beam irradiation light which is light having a light distribution pattern having a cutoff line.

The focal position of the second projection lens 29 is located on the ridge line 27*b*.

The first cutoff line forming portion 26, the second cutoff line forming portion 27, the first projection lens 28, and the second projection lens 29 are integrally formed with the light source distribution element 2 using a transmissive material.

The first emission surface 22*a* of the first emission portion 22, the one end surface and the other end surface of the first region portion 26A and the one end surface and the other end surface of the second region portion 26B in the first cutoff line forming portion 26, the flat surface of the first projection lens 28, the second emission surface 23*a* of the second emission portion 23, the one end surface and the other end surface of the first region portion 27A and the one end surface and the other end surface of the second region portion 27B in the second cutoff line forming portion 27, and the flat surface of the second projection lens 29 are not physically existing surfaces but virtual surfaces.

In the headlight module according to the fifth embodiment configured as described above, the light source distribution element 2 in which the light from the light source 1 is incident on the incident surface 21*a* reduces the divergence angle of the light by using the incident surface 21*a*. Then, the light source distribution element 2 guides, from the first emission portion 22 and the second emission portion 23 to the first cutoff line forming portion 26 and the second cutoff line forming portion 27, the parallel incident light fluxes branched into two by two light guide portions of the first light guide portion 24 and the second light guide portion 25.

A combination of the first cutoff line forming portion 26 and the first projection lens 28, and a combination of the second cutoff line forming portion 27 and the second projection lens 29 respectively emit light emitted from the first emission surface 22*a* of the first emission portion 22 and light emitted from the second emission surface 23*a* of the second emission portion 23 forward as low beam irradiation light which is light having a light distribution pattern having a cutoff line.

Therefore, since the headlight module according to the fifth embodiment uses the light source distribution element 2 according to the third embodiment that has a simple structure and can be downsized without reducing the light use efficiency, and the first cutoff line forming portion 26, the first projection lens 28, the second cutoff line forming portion 27, and the second projection lens 29 are integrally formed with the light source distribution element 2, it is possible to form an optical system for low beam irradiation light that is resistant to variations in arrangement accuracy, has a simple structure which is easy to handle, and can be downsized without reducing the light use efficiency.

Moreover, since the lower line in the joint surface between the first region portion 26A and the second region portion 26B, that is, the front end of the fifth reflection surface 26*a* is the ridge line 26*b* for forming the cutoff line, and the lower line in the joint surface between the first region portion 27A and the second region portion 27B, that is, the front end of the sixth reflection surface 27*a* is the ridge line 27*b* for forming the cutoff line, any light distribution pattern having a desired cutoff shape can be projected from the headlight module according to the fifth embodiment depending on the shapes of the ridge line 26*b* and the ridge line 27*b*.

Note that the headlight module according to the fifth embodiment includes the first projection lens 28 and the second projection lens 29, but the first projection lens 28 and the second projection lens 29 do not need to be integrally formed with the headlight module.

That is, light may be emitted from a flat surface that is the other end surface of the second region portion 26B in the first cutoff line forming portion 26 and a flat surface that is the other end surface of the second region portion 26B in the second cutoff line forming portion 27.

In addition, the first projection lens 28 and the second projection lens 29 may be concave lenses having concave emission surfaces on their surfaces.

By making the emission surface flat or concave in this manner, it is possible to irradiate the front region with light distribution in which light is diffused.

Note that, in the description of the first to fifth embodiments, terms such as "parallel" and "vertical" indicating a positional relationship between components and a shape of a component include a range which is set in consideration of manufacturing tolerances, assembly variations, and the like.

In addition, it is possible to freely combine the embodiments, to modify any component of each embodiment, or to omit any component in each embodiment.

INDUSTRIAL APPLICABILITY

The light source distribution element for a headlight device, the headlight device, and the headlight module according to the present disclosure are preferably used for headlights for a motorcycle and an automobile, particularly for a low beam.

REFERENCE SIGNS LIST

100: light condensing optical system, 1: light source, 2: light source distribution element, 21: incident portion, 21A: base portion, 21B: lens, 21*a*: incident surface, 21*b*: first joint surface, 21*c*: second joint surface, 21A: base portion, 21B: lens, 22: first emission portion, 22*a*: first emission surface, 22*b*: third joint surface, 22*c*: third reflection surface, 22A: base portion, 22B: lens, 22C: first optical path changing portion, 23: second emission portion, 23*a*: second emission surface, 23*b*: fourth joint surface, 23*c*: fourth reflection surface, 23A: base portion, 23B: lens, 23C: second optical path changing portion, 24: first light guide portion, 25: second light guide portion, 25*a*: first reflection surface, 25*b*: second reflection surface, 26: first cutoff line forming portion, 26*a*: fifth reflection surface, 27: second cutoff line forming portion, 27*a*: sixth reflection surface, 28: first projection lens, 29: second projection lens, 3: shade, 4: projection lens

The invention claimed is:

1. A light source distribution element for headlight device, the light source distribution element comprising:

an incident portion having an incident surface on which light from a light source is to be incident, and having a first joint surface and a second joint surface which are located along a first direction in a plane perpendicular to an optical axis of the light source, the incident portion configured to condense incident light and guide side-by-side light to the first joint surface and the second joint surface;

a first emission portion having a first emission surface to emit light;

a second emission portion having a second emission surface to emit light located at a position, the position being different from a position of the first emission surface of the first emission portion in the first direction and in a second direction perpendicular to the first direction, the second direction being in the plane perpendicular to the optical axis of the light source;

a first light guide portion that is located between the first joint surface of the incident portion and the first emission portion, and is to guide light from the first joint surface of the incident portion to the first emission portion; and a second light guide portion that is located between the second joint surface of the incident portion and the second emission portion, has a first reflection surface formed on one of opposite side faces of the second light guide portion in the second direction and a second reflection surface formed on another one of the opposite side faces, and is to reflect light from the second joint surface of the incident portion by using the first reflection surface and the second reflection surface to guide the light to the second emission portion.

2. The light source distribution element for headlight device according to claim 1, wherein the incident portion, the first emission portion, the second emission portion, the first light guide portion, and the second light guide portion are integrally formed of a transmissive material.

3. The light source distribution element for headlight device according to claim 1, wherein the first light guide portion is linearly formed between the first joint surface of the incident portion and the first emission portion, and the second light guide portion includes a first bent portion bent in the second direction and a second bent portion bent in an opposite direction to the first bent portion between the first joint surface of the incident portion and the first emission portion.

4. The light source distribution element for headlight device according to claim 1, wherein the incident surface of the incident portion has a positive refractive power and has a convex shape to reduce a divergence angle of light incident on the incident surface.

5. The light source distribution element for headlight device according to claim 1, wherein a relationship of $h0 \times \sin \theta 0 > h1 \times \sin \theta 1$ and $h0 \times \sin \theta 0 > h2 \times \sin \theta 2$ holds, where $h0$ is a length in the first direction of the light source, $\theta 0$ is a divergence angle in the first direction of light on the incident surface of the incident portion, $h1$ is a length in the first direction of the first emission surface of the first emission portion, $\theta 1$ is a divergence angle in the first direction of light on the first emission surface of the first emission portion, $h2$ is a length in the first direction of the second emission surface of the second emission portion, and $\theta 2$ is a divergence angle in the first direction of light on the second emission surface of the second emission portion.

6. The light source distribution element for headlight device according to claim 5, wherein each of the first emission surface of the first emission portion and the second emission surface of the second emission portion has a positive refractive power, and has a convex surface to condense light to be emitted from a corresponding one of the first emission surface and the second emission surface.

7. The light source distribution element for headlight device according to claim 1, wherein the first direction is a vertical direction, and the second direction is a left-right direction, the first emission surface of the first emission portion is disposed on a plane parallel to the first joint surface of the incident portion, and the second emission surface of the second emission portion is disposed on a plane parallel to the second joint surface of the incident portion.

8. The light source distribution element for headlight device according to claim 1, wherein the first direction is a front-rear direction, and the second direction is a vertical direction, the first emission surface of the first emission portion is located on a front surface in the front-rear direction, and the first emission portion has a third reflection surface to reflect light guided by the first light guide portion and thereby guide the light to the first emission surface, and the second emission surface of the second emission portion is located on one side face in the front-rear direction, and the second emission portion has a fourth reflection surface to reflect light guided by the second light guide portion and thereby guide the light to the second emission surface.

9. The light source distribution element for headlight device according to claim 8, wherein the third reflection surface is a reflection surface having a light condensing function.

10. The light source distribution element for headlight device according to claim 8, wherein the fourth reflection surface is a reflection surface having a light condensing function.

11. The light source distribution element for headlight device according to claim 8, wherein the third reflection surface is a reflection surface having a light condensing function, the fourth reflection surface is a reflection surface having a light condensing function, and the third reflection surface and the fourth reflection surface have respective light condensing powers different from each other.

12. A headlight module comprising:

the light source distribution element for headlight device according to claim 8;

a first cutoff line forming portion extended in the front-rear direction and integrally formed from the first emission surface of the light source distribution element for headlight device, the first cutoff line forming portion including, on a lower surface in the vertical direction, a fifth reflection surface to reflect light emitted from the first emission surface and emit light in which a cutoff line is formed; and a second cutoff line forming portion extended in the front-rear direction and integrally formed from the second emission surface of the light source distribution element for headlight device, the second cutoff line forming portion including, on a lower surface in the vertical direction, a sixth reflection surface to reflect light emitted from the second emission surface and emit light in which a cutoff line is formed.

13. The headlight module according to claim 12, wherein the first cutoff line forming portion includes a first projection lens integrally formed at an end, and the second cutoff line forming portion includes a second projection lens integrally formed at an end.

14. A headlight device comprising:

the light source distribution element for headlight device according to claim 1;

a shade disposed at a light condensing position of the light source distribution element for headlight device, and to form a cutoff line for light emitted from the light source distribution element for headlight device; and a projection lens to project light in which the cutoff line is formed by the shade.

15. A headlight module comprising:

the light source distribution element for headlight device according to claim 1;

a first cutoff line forming portion integrally formed from the first emission surface of the light source distribution element for headlight device, and to emit light in which a cutoff line for light emitted from the first emission surface is formed; and a second cutoff line forming portion integrally formed from the second emission surface of the light source distribution element for headlight device, and to emit light in which a cutoff line for light emitted from the second emission surface is formed.

* * * * *